(12) United States Patent
Leon et al.

(10) Patent No.: US 7,641,104 B1
(45) Date of Patent: Jan. 5, 2010

(54) CODED INFORMATION FOR INVENTORYING GOODS

(75) Inventors: J. P. Leon, Marina del Ray, CA (US); Keith Bussell, Los Angeles, CA (US)

(73) Assignee: Stamps.com Inc, Los Angeles, CA (US)

( * ) Notice: Subject to any disclaimer, the term of this patent is extended or adjusted under 35 U.S.C. 154(b) by 333 days.

(21) Appl. No.: 11/324,015

(22) Filed: Dec. 30, 2005

(51) Int. Cl.
*G06F 17/00* (2006.01)

(52) U.S. Cl. ...................... 235/375; 235/385

(58) Field of Classification Search .................. 235/375, 235/383, 384, 385
See application file for complete search history.

(56) References Cited

U.S. PATENT DOCUMENTS

| | | | |
|---|---|---|---|
| 5,959,275 A * | 9/1999 | Hughes et al. ............... 235/375 |
| 6,557,758 B1 * | 5/2003 | Monico ....................... 235/380 |
| 6,600,418 B2 * | 7/2003 | Francis et al. ............. 340/572.1 |
| 6,769,611 B2 * | 8/2004 | Miller et al. ................. 235/382 |
| 2002/0103728 A1 * | 8/2002 | Naghshineh et al. .......... 705/29 |
| 2003/0121968 A1 * | 7/2003 | Miller et al. ................. 235/375 |
| 2003/0164401 A1 * | 9/2003 | Andreasson et al. ........ 235/385 |
| 2003/0183697 A1 * | 10/2003 | Porter ........................ 235/492 |
| 2004/0004119 A1 * | 1/2004 | Baldassari et al. .......... 235/384 |
| 2004/0024644 A1 * | 2/2004 | Gui et al. ....................... 705/22 |
| 2004/0024660 A1 * | 2/2004 | Ganesh et al. ................. 705/28 |
| 2004/0046020 A1 * | 3/2004 | Andreasson et al. ........ 235/385 |
| 2004/0215480 A1 * | 10/2004 | Kadaba .......................... 705/1 |
| 2005/0099292 A1 * | 5/2005 | Sajkowsky ............. 340/539.13 |
| 2005/0102203 A1 * | 5/2005 | Keong .......................... 705/28 |
| 2005/0116047 A1 * | 6/2005 | Lu et al. ....................... 235/487 |
| 2005/0119786 A1 * | 6/2005 | Kadaba ....................... 700/224 |
| 2006/0054682 A1 * | 3/2006 | de la Huerga ............... 235/375 |
| 2006/0138223 A1 * | 6/2006 | Schar .......................... 235/384 |
| 2006/0282271 A1 * | 12/2006 | Ananda et al. .................. 705/1 |
| 2006/0290502 A1 * | 12/2006 | Rawlings ................. 340/572.1 |

* cited by examiner

*Primary Examiner*—Michael G Lee
*Assistant Examiner*—Paultep Savusdiphol
(74) *Attorney, Agent, or Firm*—Fulbright & Jaworski L.L.P.

(57) ABSTRACT

Systems and methods for using information, provided in association with a shipping parcel containing or associated with the goods, by a shipping service provider and a recipient of the goods are shown. According to one embodiment, coded data, such as provided in a radio frequency identification (RFID) tag or barcode, is used to identify the parcel and the goods, either directly or through correlation with other information, such as shipping information and/or inventory information. The coded data is preferably in a format readable by both the shipping service provider and the recipient of the parcel.

47 Claims, 3 Drawing Sheets

CODED INFORMATION FOR INVENTORYING GOODS

TECHNICAL FIELD

This invention relates in general to inventory tracking, and specifically relates to tracking shipped inventory.

BACKGROUND OF THE INVENTION

There are currently two main technologies using coded information to track parcels. First, Radio Frequency Identification (RFID) is a new technology that is being adopted by many companies, both shippers and receivers. Currently RFID tags on consumer products usually look like a square or rectangular sticker with a Universal Product Code (UPC) symbol on one side and a coiled wire on the other side. The coiled wire is an antenna that receives radiated power from a scanner, and it uses the power to operate a small chip on the tag. When powered, the chip outputs data written thereon, and the data is transmitted in a radio signal using the antenna. RFID tags simply output a data string (e.g., a unique string of numbers) stored therein when excited by a scanner, and any RFID scanner can usually read the numbers stored to a given tag (although the particular numbers may make sense only to a specific tracking application). Accordingly, the numbers on a RFID tag are nearly universally readable.

The second kind of technology used to track parcels is the barcode, which has been used extensively for decades now. Generally, a barcode is a printed pattern that can be scanned with an optical scanner. The pattern of a barcode represents information, as defined by a particular barcode application. For the most part, a barcode scanner from one application cannot read a barcode from another application because different applications typically use different barcode standards.

Currently, shipping companies use either or both technologies to track the parcels from pick-up to delivery. Upon delivery and opening of the parcels, a recipient uses its own tracking system to inventory the goods in the parcels. In other words, tracking of the parcel ends at the dock of the recipient, and tracking of the goods begins at the dock. Despite the widespread use of both technologies to track parcels, there is no system currently available to indicate to a recipient on the parcel the receipt of the goods therein.

BRIEF SUMMARY OF THE INVENTION

Some embodiments of the present invention are directed to systems and methods which tie a shipping label of a parcel to the goods contained in the parcel. According to an exemplary embodiment, a label is created and attached to a parcel before it is shipped. The label includes coded information thereon, and may be, e.g., a barcode tag or RFID tag. Further, the label may be part of the shipping label or separate from the shipping label on the parcel. The label includes coded information thereon that, according to embodiments, when read by the shipper is used in tracking shipment of the parcel and when read by the recipient of the parcel indicates receipt of the goods.

In one example, the shipper writes an inventory number directly to the label, the number being compatible with an inventory system of the recipient. Upon receipt, the recipient scans the label and is able to inventory the goods without opening the parcel and without scanning the goods individually.

In another example, other coded information on the label is linked to the goods. For instance, a package identification number for the parcel that is coded and readable by the recipient is linked to a description of the goods, a number of goods shipped, the inventory number of the goods, the serial number of each of the goods, etcetera. This may be accomplished by sending a message from the shipper to the recipient specifying that particular goods with the inventory number are included in a parcel with the package identification number. The recipient may use the message to cross-reference the package identification number with the inventory number of the goods. Because of the cross-reference explained above, the package identification number, when read by the recipient, indicates receipt of the particular goods included in the package. Upon receipt, the recipient scans the coded information, thereby discovering the package identification number of the parcel. The recipient's system then verifies receipt of the goods based on the scanning.

Using the techniques described above, various embodiments of the present invention marry the shipping system of the parcel shipper to the recipient's goods inventory system. As a result, some embodiments make it possible for a recipient to track inventory using the same shipping label that a shipper used to track the corresponding parcel. Accordingly, a recipient may readily receive shipped goods into the recipient's inventory control system. Because the shipping label provides information to the recipient indicative of the particular goods shipped, rather than just the package shipped, a recipient may receive the goods into the recipient's inventory control system as the package is received and electronically scanned by the recipient. Moreover, because the shipping label provides information to the shipper used in tracking the package, shipping data (e.g., date of shipment, shipping route, shipping carrier, shipping way-points, date of delivery, identification of shipping personnel handling the shipment, identification of receiver personnel receiving the shipment, etcetera) may readily be associated with the individual goods by the receiver. For example, the receiver's inventory control system may interface with the shipper's tracking system to obtain shipping information and store that information in association with the records of the particular goods.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawings, in which.

DETAILED DESCRIPTION OF THE INVENTION

Figure 1:
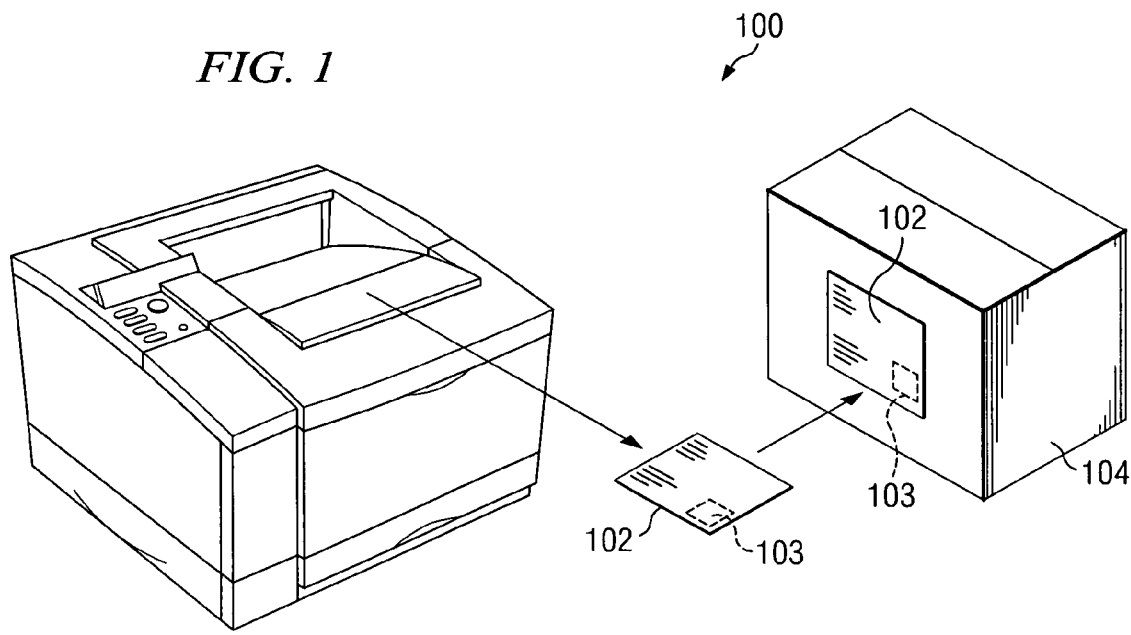
FIG. 1 is an illustration of an exemplary system for shipping goods, adapted according to at least one embodiment of the invention.

FIG. 1 is an illustration of exemplary system 100 for shipping goods, adapted according to at least one embodiment of the invention. Exemplary system 100 includes data writing component 101, which in this example comprises a computer printer and/or electronic programmer (e.g., radio frequency data chip programmer capable of writing data to a radio frequency identification circuit). Data writing component 101 of embodiments is operable to write coded data to parcel 104 by producing shipping label 102, which is associated with (e.g., adhesively coupled to) parcel 104. Data writing component 101 may be associated with a postage accounting and applying system (i.e., a franking machine), such as, for example, are available through STAMPS.COM™ Inc, such that data writing component 101 is located at an office of a private user of a shipping service. Alternatively, data writing component 101 may be used by a shipping service provider (e.g., United States Postal Service, United Parcel Service, Federal Express, or the like) to apply shipping information and/or postage at a drop-off site.

Parcel 104 is a package used for shipping goods (not shown) to a recipient, and may be a box, envelope, crate, or the like. Shipping label 102 includes coded information 103 in a format readable by both a shipping service provider and a recipient of the parcel. Additionally, coded information 103 of embodiments comprises information readable by a shipper (e.g., vendor) of the goods shipped within parcel 104. Coded information 103 may comprise information and/or a data format, or portion thereof, specified by a shipper and/or recipient to uniquely identify the goods in parcel 104 to the shipper and/or recipient. Additionally or alternatively, coded information 103 may comprise information and/or a data format, or portion thereof, specified by a shipper to uniquely identify the parcel to the shipper. Such coded information 103 may be written to a Radio Frequency Identification (RFID) tag, a barcode, and/or the like, such as by data writing component 101. Alternatively, coded information 103 may comprise unique information, such as an RFID identification number supplied by an RFID tag manufacturer, which is associated with parcel 104 by a shipping service provider and the particular goods within parcel 104 by a shipper and/or recipient of parcel 104.

In traditional systems, a shipping label, such as label 102, would include a package identification number coded onto a barcode tag so that a shipping service is able to track a parcel, such as parcel 104, by scanning the barcode tag at various points along the parcel's route. In those traditional systems, the package identification number is written in a format that is usually not readable by the recipient or is otherwise meaningless to the recipient. Further in traditional systems, the shipping label includes no informational content that may be used to provide an indication about the goods themselves, as the shipping label only describes the parcel. However, in system 100, coded information 103 is readable by the recipient and includes information that indicates receipt of the goods in parcel 104, as explained further below.

According to embodiments of the invention, information 103 as read by a shipping service provider may be utilized in tracking the shipment of parcel 104, such as to create a detailed shipping record including date of shipment, shipping route, shipping carrier, shipping way-points, date of delivery, identification of shipping personnel handling the shipment, identification of receiver personnel receiving the shipment, etcetera. Information 103 as read by a receiver of parcel 104 may be used to indicate receipt of the particular goods contained in the parcel by the recipient, such as to populate or update the recipient's inventory control system. Moreover, the receiver's inventory control system may interface with the shipper's tracking system to obtain shipping information and store that information in association with the records of the particular goods.

Figure 2:
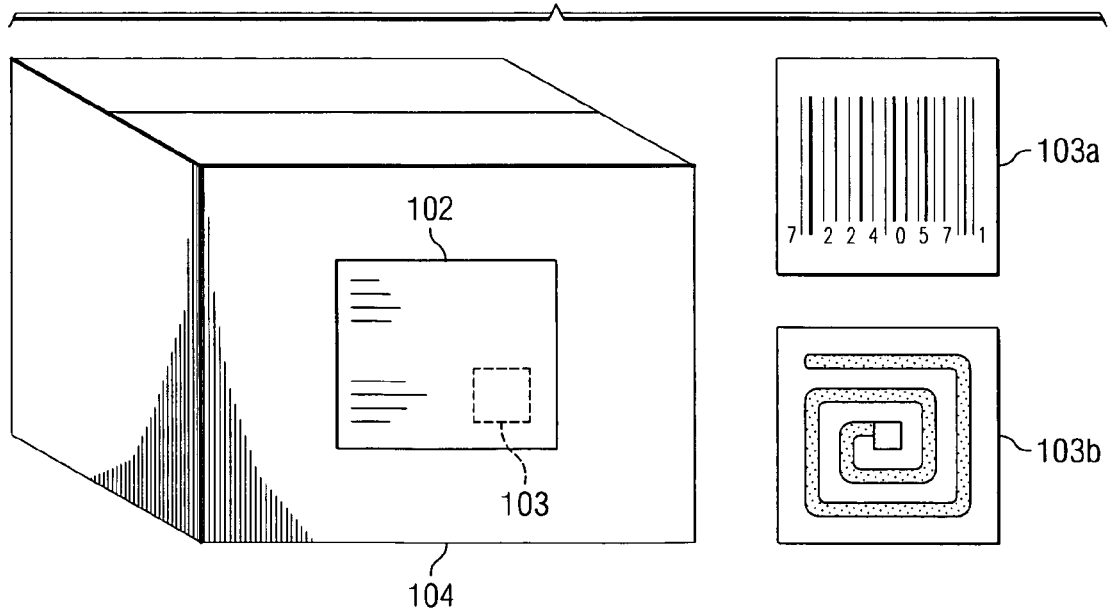
FIG. 2 is an illustration of an exemplary parcel for shipping goods, adapted according to at least one embodiment of the invention.

FIG. 2 is an illustration of exemplary parcel 104 for shipping goods, adapted according to at least one embodiment of the invention. FIG. 2 provides a more detailed view of parcel 104, coded information 103, and shipping label 102 of embodiments of the invention. Shipping label 102 of the illustrated embodiment is adhesively attached to parcel 104 to provide destination information and package identification information to the shipping service provider during the shipping and delivery process. Coded information 103 may provide destination and identification information easily accessible through use of a scanning mechanism. For instance, coded information 103 may be printed in a barcode, as in 103a, or may be programmed into a RFID tag, as shown in 103b. Appropriate scanners can then quickly decode the information and present it to a user, update a database, and the like.

Coded information 103 of embodiments includes information that can be read by the recipient of parcel 104, and such information indicates receipt of the goods when read by the recipient. In one example, barcode 103a is written in a format that is compatible with the recipient's intake and/or inventory system so that the recipient may use its existing scanning hardware and software to read information 103. In another example, such information is programmed into RFID tag 103b, which may be read by most or all RFID readers available on the market. The invention is not limited to barcodes and RFID tags, as any other technique now known or later developed to write coded information to parcel 104 may be used as long as it is at least partially readable by the recipient.

Not only is coded information 103 readable by the recipient, but it also indicates receipt of the particular goods contained within parcel 104 when read by the recipient according to embodiments of the invention. For example, coded information 103 may contain or correspond to, among other things, a description of the goods, a number of goods shipped, the inventory number of the goods, the serial number of each of the goods, etcetera useful according to the recipient's intake/inventory system. Thus, when the recipient scans coded information 103, the intake/inventory system recognizes the numbers and updates the recipient's system to show receipt of the goods.

According to embodiments, coded information 103 serves the dual purposes of being information for the shipping service and information for the recipient. For example, coded information 103 may include or correspond to a package identifier for the shipping service to scan and use in tracking parcel 104. The package identifier may be linked to inventory numbers identifying the goods in the recipient's intake/inventory system through a database, such that when the recipient scans the shipping label, the intake/inventory system searches for the package identification number in the database, recognizes that it is associated with uniquely identified goods, and verifies receipt of the goods. Accordingly, information that is usually only used by the shipping service may also be used to indicate receipt of goods when read by the recipient.

The examples above help to illustrate the difference between information that describes a parcel and information that describes the goods carried in the parcel. Traditional shipping services have heretofore not used coded information on a parcel to uniquely identify goods in a format that can be read and understood by recipients. Various embodiments of the present invention provide such a feature directly, e.g., by including recipient inventory numbers or other information identifying the goods to the recipient on the parcel, or indirectly, e.g., by linking other information to recipient inventory numbers or other information identifying the goods to the recipient.

In traditional systems, manufacturers of goods have placed RFID tags directly onto the goods before shipping so that recipients may scan the goods into an inventory system upon receipt. However, such a system has disadvantages. For example, once the goods leave the parcel, delivery information regarding the goods is often lost unless the recipient actively links package numbers and identification of goods before the parcel is discarded. In various embodiments of the present invention, such linking is performed with assistance from the shipper or shipping service, thereby relieving the recipient from some administrative burden. It should be noted that various embodiments of the present invention do not preclude the use of manufacturer-supplied RFID tags on goods.

Further, various embodiments of the present invention allow a recipient to verify delivery of both the parcel and the goods using one scanning system, whereas such traditional system require one scanning system for the goods and provide no scanning system at all for the parcel, since traditional systems usually have no coded information that may be read and understood by the recipient. Further, various embodiments of the present invention may allow for closer and more coherent cooperation between and shipper/shipping service and recipient since both parties may track the parcel and goods.

Figure 3:
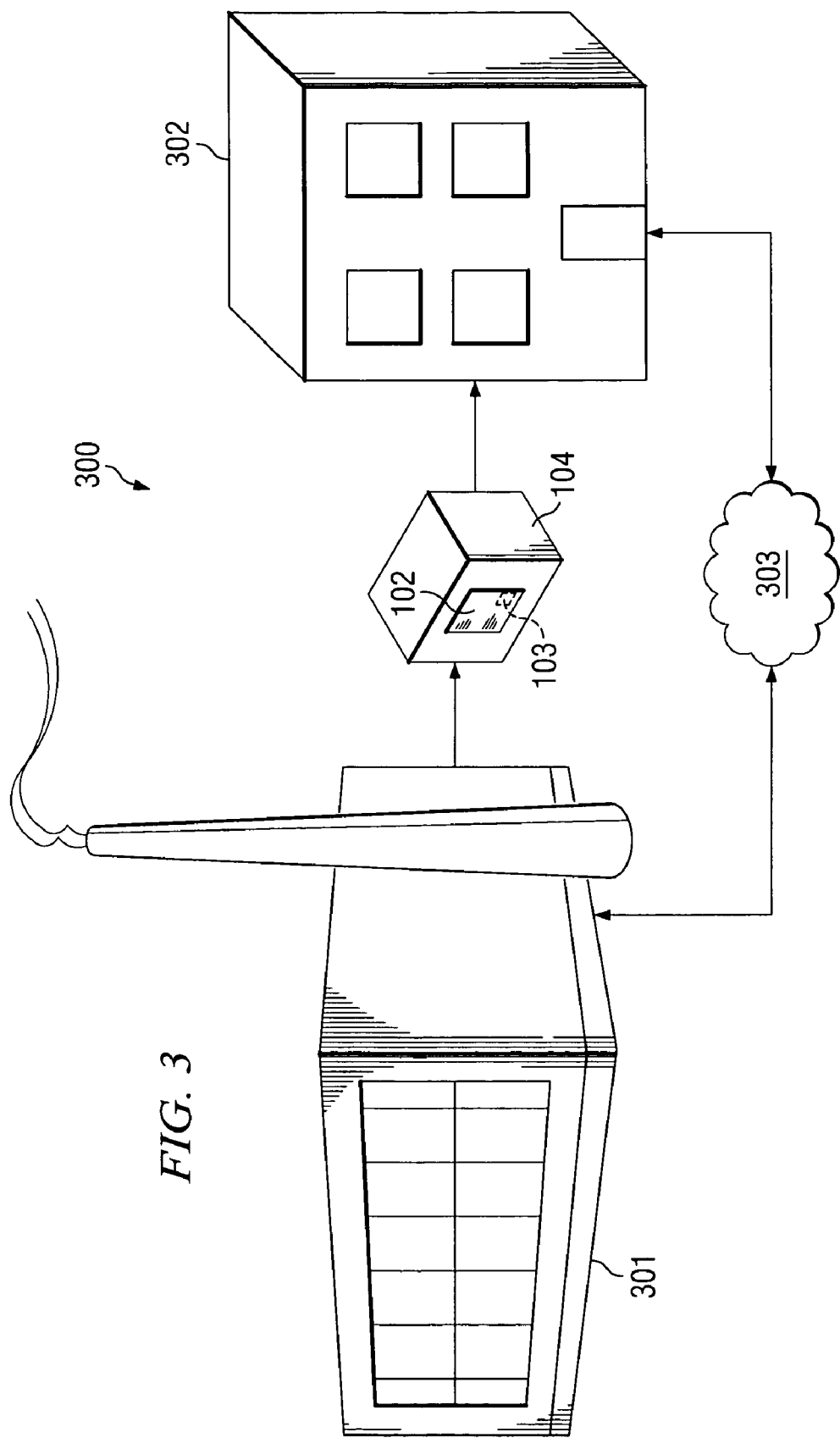
FIG. 3 is a diagram of an exemplary system for shipping goods, adapted according to at least one embodiment of the invention.

FIG. 3 is a diagram of exemplary system 300 for shipping goods, adapted according to at least one embodiment of the invention. In system 300, shipper 301 sends goods to recipient 302 using parcel 104 with label 102 and coded information 103. Shipper 301 and recipient 302 communicate via network 303, which may be a Public Switched Telephone Network (PSTN) a wireless network (e.g., cellular network), or a computer network, such as a Wide Area Network (WAN), a Local Area Network (LAN), the Internet, or the like.

Shipper 301, in this example, has a data writing component (e.g., data writing component 101 of FIG. 1) to apply postage to parcel 104 by printing shipping label 102. Shipping label 102 includes coded information 103 that is readable by recipient 302 and indicates receipt of the goods when read by recipient 302. Data writing component 101 may include a printer, programmer, etcetera that can write coded information 103, such as by printing barcodes and/or programming RFID tags.

When shipper 301 is ready to ship the goods to recipient 302, shipper 301 prepares parcel 104 and prints shipping label 102. In an embodiment wherein coded information 103 includes an inventory number of the goods according to an inventory system of recipient 302, such inventory number may be directly written into coded information 103. Recipient 302 may send a message to shipper 301 via network 303 before shipping to inform shipper 301 of the inventory numbers to be used to identify the goods in parcel 104. Shipper 301 then ships parcel 104 to recipient 302 with coded information 103 written to shipping label 102. Upon receipt, recipient 302 scans shipping label 102 and decodes coded information 103, thereby reading the inventory numbers and verifying receipt of the uniquely-identified goods.

In an embodiment wherein coded information 103 is linked to inventory numbers of the goods, recipient 302 may send a message to shipper 301 before shipment of the goods informing shipper 301 of the inventory numbers to use for the goods. Shipper 301 then prints label 102 with coded information 103 and sends parcel 104 to recipient 302 via a parcel service. Before, during, or after shipping, and most likely before an expected delivery time of parcel 104, shipper 301 sends a message to recipient 302 via network 303 that links coded information 103 with information identifying the goods. For example, the message may indicate that package "1286983" includes widget "324X" and widget "325X," wherein "1286983" is the package identification number of parcel 104, and the widget numbers are numbers compatible with an inventory system of recipient 302. The message may be an email, a document over File Transfer Protocol (FTP), an Electronic Data Interchange (EDI) message, or the like.

As a result of the message, the package identification number indicates receipt of the widgets when it is read by recipient 302. In this example, the inventory system of recipient 302 automatically cross-references the package identification number and the widget numbers upon receiving the message, such that upon scanning the package identification number, the inventory system recognizes that parcel 104 includes the identified widgets. Recipient 302 then receives parcel 104, decodes coded information 103, and updates the inventory system database to reflect that the goods have been received. In any embodiment described above, it is possible for recipient 302 to send a confirmation message to shipper 301 via network 303 so that shipper 301 can update its own records.

It should be noted that the example of FIG. 3 describes an embodiment wherein coded information 103 indicates receipt of more than one piece of merchandise (e.g., two widgets). Various embodiments are able to provide coded information readable by a recipient to indicate receipt of any number of separate pieces of merchandise. While a linking message embodiment (as described above) may in some instances be preferable to directly writing inventory numbers in coded information 103 when the number of separate pieces of merchandise exceeds one, barcode and RFID products that are scalable to include more information may be developed and used with various embodiments.

As mentioned above, coded information 103 may be in the form of an RFID tag. Such an embodiment may provide the advantage of being scannable from a small distance and not requiring line-of site scanning. Further, most RFID tags are readable by any RFID scanner on the market, so that a shipper and recipient may use disparate hardware to read the same tags.

In an alternate embodiment, coded information 103 may be written to a second bar code in addition to any package identification barcode, where the second barcode is in a format of the recipient's inventory tracking format. This may require a shipper to specifically know which program the recipient uses to scan barcodes, since different barcode formats are usually not compatible. In yet another alternate embodiment, the shipper may add a front-end portion of code in a barcode tag or RFID tag that allows the user's system to properly read a given barcode format on a shipping label by converting the information thereon to information usable by its internal systems.

Figure 4:
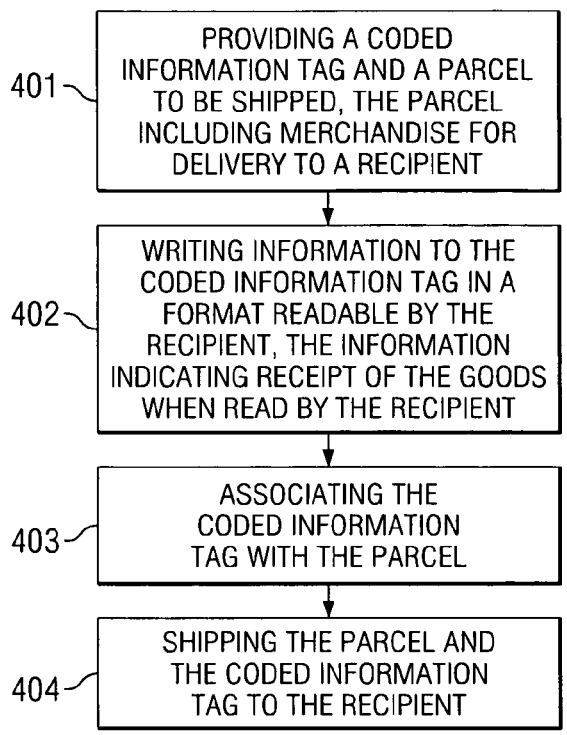
FIG. 4 illustrates an exemplary method that may be performed by a shipper of goods, such a manufacturer, a wholesaler, a parcel shipping company, or any other entity that may send parcels to a recipient, the method adapted according to at least one embodiment of the invention.

FIG. 4 illustrates exemplary method 400 that may be performed by a shipper of goods, such as a manufacturer, a wholesaler, a parcel shipping company, or any other entity that may send parcels to a recipient, the method adapted according to at least one embodiment. In step 401, the shipper provides a coded information tag and a parcel to be shipped, the parcel including merchandise for delivery to a recipient. The coded information tag may be a barcode tag, a RFID tag, or any other coded information tag now known or later developed. Further, the coded information tag be the same as a shipping label, a part of the shipping label, or separate from the shipping label.

In step 402, the shipper writes information to the coded information tag in a format readable by the recipient, the information indicating receipt of the goods when read by the recipient. The writing may be performed by a data writing component, such as a printer, and, in fact, may be a printer that is part of a franking system operable to store and apply postage and other parcel delivery indicia to parcels. The printer may also be operable to program and verify RFID tags.

In one example embodiment, the information is one or more numbers compatible with an inventory system of the recipient written directly to, e.g., a barcode tag or RFID tag, which the recipient can read. In another example, readable content on the tag, such as a package identification number, can be linked to inventory numbers for the goods, the inventory numbers being compatible with the recipient's inventory system. Such linking may include cross-referencing a database of the recipient to associate the readable content with the inventory numbers in response to receiving a message from the shipper. Other techniques exist and are within the scope of various embodiments, as long as those techniques provide readable coded content to the parcel that indicates receipt of goods when read by a recipient.

In step 403, the shipper associates the coded information tag with the parcel. The shipper may, for example, adhesively attach a shipping label or manifest containing the coded information to the parcel. In another example, the shipper may print the coded information directly on the surface of the parcel. Various embodiments are not limited by manner of associating the coded information tag with the parcel.

In step 404, the shipper sends the parcel and the coded information tag to the recipient. For example, the shipper may be a private entity that deposits the parcel with a shipping service. In another example, the shipper is a parcel service that inserts the parcel into its delivery processes.

Figure 5:
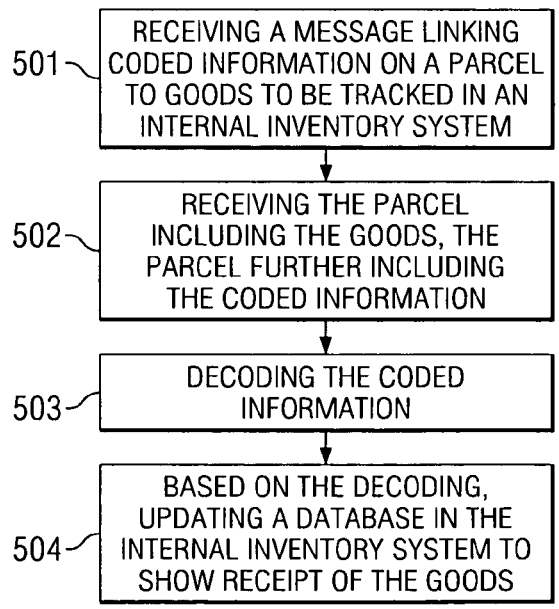
FIG. 5 illustrates an exemplary method that may be performed by a recipient of goods, such a warehouser, a retailer, or any other entity that may receive parcels, the method adapted according to at least one embodiment of the invention.

FIG. 5 illustrates exemplary method 500 that may be performed by a recipient of goods, such a warehouser, a retailer, or any other entity that may receive parcels, the method adapted according to at least one embodiment. In step 501, the recipient receives a message linking coded information on a parcel to goods to be tracked in an internal inventory system. For example, the message may be sent from a shipper before delivery of the goods to allow the recipient to cross reference the coded information to the goods in a database of the internal inventory system. The message may be the same or similar to the message described above with regard to FIG. 4.

In step 502, the recipient receives the parcel including the goods, the parcel further including the coded information. The coded information may be, for example, the shipping label, part of the shipping label, or separate from the shipping label. The coded information may be written to a barcode label, a RFID label, or any other coded information delivery mechanism now known or later developed.

In step 503, the recipient decodes the coded information. For example, the recipient may scan a barcode with an optical scanner or scan a RFID tag with an RFID reader. The scanner or reader then converts the coded information into a format usable by, e.g., a database in the recipient's inventory system.

In step 504, the recipient, based on the decoding, updates a database in the internal inventory system to show receipt of the goods. In this manner, the recipient uses readable coded data on the parcel to identify and inventory the goods in the parcel. In effect, this example embodiment extends the life of the shipping label beyond mere delivery to at least the first inventory step for goods.

While method 500 describes an exemplary embodiment wherein the coded data is linked to the goods through use of a message from the shipper to the recipient, other embodiments are within the scope of the invention. For example, in another embodiment, the linking is performed in a shared database that is internal to neither the shipper nor the recipient, e.g., is hosted by a third party. In such a case, the coded data and the goods may be linked by a message sent to the hosting party. The invention is not limited to any particular method of linking coded information on the parcel to goods inside the parcel. Further, some other example embodiments include data identifying the goods directly, by e.g. inventory serial number, on the parcel, such that there is no need to link the coded data to the goods. Such an example embodiment is described above with regard to FIG. 3.

Various embodiments of the invention are not limited to the flows of methods 400 and 500. In fact, steps may be added, deleted, or rearranged in methods 400 and 500 while still remaining within the scope of the invention. For instance, method 400 may include receiving a message from the recipient describing particular inventory numbers to use for certain pieces of merchandise. Additionally, method 500 may further include sending a confirmation message to the shipper when the parcel is received.

In yet another example, the shipper uses the label to track the parcel. The recipient then uses the coded information in the label to download the history of the goods contained in the parcel. This may be especially helpful when the goods are damaged or late, allowing the user to scrutinize shipment as a possible cause. For instance, if temperature-sensitive goods are damaged, the recipient may check the history and see that the goods were shipped trough an area with a climate that is too cold or too warm. The recipient might then be able to request alternate shipping routes for future deliveries.

Figure 6:
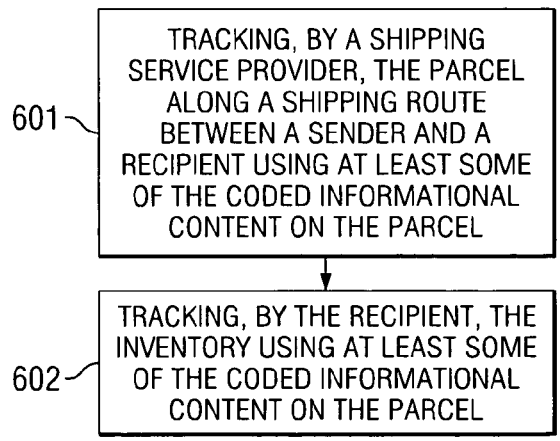
FIG. 6 illustrates an exemplary method that may be performed to track a parcel and its corresponding inventory, the method adapted according to at least one embodiment of the invention.

FIG. 6 illustrates exemplary method 600 that may be performed to track a parcel and its corresponding inventory, the method adapted according to at least one embodiment of the invention. As mentioned above, some embodiments may make it possible for a recipient to track its inventory using the same label that the shipping service provided uses to track the parcel. Such an example is described in method 600. In this example, the parcel includes coded informational content. In step 601 a shipping service provider tracks the parcel along a shipping route between a sender and a recipient using at least some of the coded informational content on the parcel. For instance, the coded informational content may be a package identification number or other shipping information on a shipping label written to a barcode or RFID tag.

In step 602, the recipient tracks the inventory using at least some of the coded informational content on the parcel. For instance, the recipient may use the same package identification number or other shipping information on the shipping label to track the inventory. In such an embodiment, the package identification number or other shipping information may be linked to one or more inventory numbers in the recipient's tracking system, such as, for example, by an email or other message making the association between the shipping information and the one or more inventory numbers.

Advantages of some embodiments of the present invention include allowing a customer to scan in a parcel and its goods in one short step, rather than having to enter parcel data and merchandise data in two or more steps. Further, the recipient does not need to open the package or to infer the contents based on a sender address to discover what the parcel holds. Further, embodiments that employ RFID technology to write coded data leverage the rapid spread, near universal readability, and low cost of this convenient tracking technology. Still further, while current traditional recipient inventory systems allow tracking of merchandise only when the box is opened, various embodiments of the invention allow merchandise tracking (in addition to parcel tracking) to reach back to the sender.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A system for shipping goods, said system comprising:
a data carrier having data electronically retrievable therefrom, said data carrier attached to a parcel carrying said goods, said data being coded in a format readable by a shipping service provider of said parcel, wherein said shipping service provider is an entity that provides shipping of parcels from a sender to an intended recipient and is not associated with said sender or said recipient, and readable by a recipient of said parcel, wherein a format of at least a portion of said electronically retrievable data is specified by said recipient, wherein said data as read by said shipping service provider is used in tracking shipment of said parcel and said data as read by said recipient is used to indicate receipt of said goods by said recipient.

2. The system of claim 1 wherein said electronically retrievable data comprises a shipping tracking identifier for said parcel in a tracking system of said shipping service provider and an inventory identifier for said goods in an inventory control system of said recipient.

3. The system of claim 1 wherein said electronically retrievable data corresponds to a shipping tracking identifier for said parcel in a tracking system of said shipping service provider and an inventory identifier for said goods in an inventory control system of said recipient.

4. The system of claim 1 wherein said electronically retrievable data is retrievable using Radio Frequency Identification (RFID) technology.

5. The system of claim 1 wherein said electronically retrievable data is retrievable using barcode technology.

6. The system of claim 1 wherein at least a portion of said electronically retrievable data is unique to said shipping service provider.

7. The system of claim 1 wherein at least a portion of said electronically retrievable data is unique to said recipient.

8. The system of claim 1 wherein a format of at least a portion of said electronically retrievable data is specified by said shipping service provider.

9. The system of claim 1 wherein said electronically retrievable data is coded in a format readable by a shipper of said parcel.

10. The system of claim 1 further comprising:
a communicating component operable to send a message to said recipient linking said electronically retrievable data to identifying information for said goods compatible with an inventory system of said recipient.

11. The system of claim 10 wherein said message is an email.

12. The system of claim 10 wherein said message is an Electronic Data Interchange (EDI) message.

13. The system of claim 10 wherein said electronically retrievable data comprises a package identifier, and wherein said message specifies that said parcel with said package identifier includes said goods.

14. The system of claim 10 wherein said communicating component is further operable to receive a message from said recipient specifying said identifying information for said goods.

15. A system for tracking goods, said system comprising:
a parcel for carrying said goods;
destination information attached to said parcel and in a format compatible with a shipping system of a parcel service; and
an electronically readable coded data packet attached to said parcel and in a format compatible with said shipping system of said parcel service and compatible with an intake scanning system of said recipient, said electronically readable coded data packet having information therein identifying said goods to said intake scanning system when scanned by said intake scanning system and identifying said parcel to said shipping system, wherein a format of at least a portion of said electronically readable coded data packet is specified by said recipient.

16. The system of claim 15 wherein said information comprises a parcel identification string that is linked to one or more identifiers in an inventory system of said recipient, said one or more identifiers uniquely identifying said goods in said inventory system.

17. The system of claim 16 wherein said destination information and said coded data packet are both written to a shipping label for said parcel.

18. The system of claim 15 wherein said coded data packet comprises one or more of:
   a Radio Frequency Identification (RFID) tag; and
   a barcode.

19. The system of claim 18 wherein said coded data packet comprises a serial number of said goods written directly to said RFID tag.

20. The system of claim 15 wherein said coded data packet comprises a shipping tracking identifier for said parcel in a tracking system of said parcel service and an inventory identifier for said goods in an inventory control system of said recipient.

21. The system of claim 15 wherein said coded data packet comprises data corresponding to a shipping tracking identifier for said parcel in a tracking system of said parcel service and an inventory identifier for said goods in an inventory control system of said recipient.

22. The system of claim 15 further comprising a database correlating data contained within said data packet to said data corresponding to a shipping tracking identifier.

23. The system of claim 15 further comprising a database correlating data contained within said data packet to said inventory identifier.

24. The system of claim 15 wherein at least a portion of data within said coded data packet is unique to said parcel service.

25. The system of claim 16 wherein at least a portion of data within said coded data packet is unique to said recipient.

26. The system of claim 15 wherein a format of at least a portion of said coded data packet is specified by said parcel service.

27. A method for shipping goods, said method comprising:
   providing a coded information tag and a parcel to be shipped, said parcel including merchandise for delivery to a recipient;
   writing information to said coded information tag in a format readable by said recipient, the format of at least a portion of said information being specified by said recipient, to indicate receipt of said goods, wherein said information describes said merchandise in an inventorying format of said recipient, and readable by said shipping service provider to track shipment of said parcel;
   associating said coded information tag with said parcel; and
   shipping said parcel and said coded information tag to said recipient.

28. The method of claim 27, wherein a portion of said information is supplied by said recipient.

29. The method of claim 27 further comprising sending a message to said recipient linking said information to one or more inventory identifiers identifying said merchandise, said one or more inventory identifiers for use in an inventory system of said recipient.

30. The method of claim 29 further comprising receiving a message from said recipient specifying said one or more inventory identifiers before performing said writing information.

31. The method of claim 27 wherein said coded information tag comprises a Radio Frequency Identification (RFID) tag.

32. The method of claim 27 wherein said coded information tag comprises a barcode.

33. The method of claim 27 wherein associating said coded information tag with said parcel includes affixing said tag to said parcel as at least part of a shipping label.

34. A method for tracking inventory, said method comprising:
   receiving a message linking coded information on a parcel to goods to be tracked in an inventory system, said goods being contained in said parcel;
   shipping said parcel including said goods;
   decoding said coded information by a shipping service provider for use in tracking shipment of said parcel including said goods;
   receiving said parcel including said goods;
   decoding said coded information by a recipient of said parcel including said goods; and
   based on said decoding, updating a database in said inventory system to show receipt of said goods included in said parcel, wherein a format of at least a portion of said coded information is specified by said recipient.

35. The method of claim 34 wherein said coded information comprises a serial number of said goods.

36. The method of claim 34 wherein said coded information comprises an identification of said parcel.

37. The method of claim 36 wherein said message links said identification of said parcel to an inventory number in a format compatible with said inventory system.

38. A method for tracking a parcel and its corresponding inventory, said parcel including an attached data carrier having data electronically retrievable therefrom, said method comprising:
   tracking, by a shipping service provider that provides delivery of a package from a sender to an intended recipient and is not affiliated with said sender or said intended recipient, said parcel along a shipping route between a sender and a recipient using at least some of said electronically retrievable data on said parcel; and
   tracking, by said recipient, said inventory using at least some of said electronically retrievable on said parcel, wherein a format of at least a portion of said electronically retrievable data is specified by said recipient.

39. The method of claim 38 further comprising:
   correlating shipping information from said tracking to said inventory thereby providing shipping history with respect to particular inventory items contained within said parcel.

40. The method of claim 39 wherein said shipping history is stored within an inventory control system of said recipient in association with other information associated with said particular inventory items.

41. The method of claim 38 wherein said recipient and said shipping service provider use a same portion of said coded informational content to perform said respective tracking steps.

42. The method of claim 41 wherein said same portion of said coded informational content is shipping information on a shipping label of said parcel.

43. The method of claim 38 wherein said same portion of said coded informational content is linked to one or more inventory numbers in a tracking system of said recipient.

44. A system for shipping goods, said system comprising:
   a data carrier having electronically retrievable data thereon, said data being coded in a format readable by a shipping company, wherein said shipping company provides delivery of an item from a sender to an intended recipient and is not affiliated with the sender or recipient, and further wherein said data as read by said shipping company is used in tracking shipment of an item in a tracking system maintained by said shipping company and readable by a recipient of said parcel, wherein said data as read by said recipient is used to indicate receipt of goods by said recipient in an inventory control system maintained by said recipient, and wherein a format of at least a portion of said electronically retrievable data is specified by said recipient.

45. The system of claim 44 wherein said shipping company comprises a service selected from the group comprising:
a government operated postal service;
a private package delivery service;
a global package delivery service;
a time-definite delivery service;
an overnight delivery service; or
a next day delivery service.

46. The system of claim 44 wherein a portion of said electronically retrievable data is specified by said recipient.

47. The system of claim 46 wherein said portion of said electronically retrievable data specified by said recipient comprises inventory numbers.

* * * * *

UNITED STATES PATENT AND TRADEMARK OFFICE
CERTIFICATE OF CORRECTION

PATENT NO. : 7,641,104 B1 Page 1 of 1
APPLICATION NO. : 11/324015
DATED : January 5, 2010
INVENTOR(S) : Leon et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 503 days.

Signed and Sealed this

Sixteenth Day of November, 2010

David J. Kappos
*Director of the United States Patent and Trademark Office*